United States Patent
Meckel et al.

(10) Patent No.: US 12,491,273 B2
(45) Date of Patent: Dec. 9, 2025

(54) RADIOPHARMACEUTICALS AT DIFFERENT ACTIVITY REFERENCE TIMES

(71) Applicant: ITM Isotope Technologies Munich SE, Garching (DE)

(72) Inventors: Marian Meckel, Freising (DE); Jacek Koziorowski, Freising (DE); Mark Harfensteller, Unterschleissheim (DE); Karl-Heinz Schneider, Oberpframmern (DE)

(73) Assignee: ITM Isotope Technologies Munich SE, Garching (DE)

( * ) Notice: Subject to any disclaimer, the term of this patent is extended or adjusted under 35 U.S.C. 154(b) by 0 days.

(21) Appl. No.: 18/286,675

(22) PCT Filed: Mar. 17, 2022

(86) PCT No.: PCT/EP2022/057040
§ 371 (c)(1),
(2) Date: Oct. 12, 2023

(87) PCT Pub. No.: WO2022/218640
PCT Pub. Date: Oct. 20, 2022

(65) Prior Publication Data
US 2024/0197929 A1 Jun. 20, 2024

(30) Foreign Application Priority Data
Apr. 13, 2021 (DE) .................... 10 2021 109 246.9

(51) Int. Cl.
*A61K 51/08* (2006.01)
(52) U.S. Cl.
CPC ................................ *A61K 51/088* (2013.01)

(58) Field of Classification Search
CPC ............................ A61K 51/088; A61K 51/121
See application file for complete search history.

(56) References Cited

U.S. PATENT DOCUMENTS

| 10,596,278 B2 | 3/2020 | De Palo et al. |
| 2004/0028606 A1 | 2/2004 | Schwarz |
| 2014/0294700 A1 | 10/2014 | Marx |

FOREIGN PATENT DOCUMENTS

| EP | 1289571 | 2/2004 |
| WO | 2018122250 | 10/2014 |

OTHER PUBLICATIONS

Office Action dated Nov. 29, 2021, for corresponding German Patent Application No. 102022121665.9.
Ritawidya et al., Synthesis of DOTA-TOC Conjugate as a Precursor of 177Lu-DOTA-TOC Radiopharmaceutical for Therapy and Diagnosis of Somatostatin Receptor Positive Cancer. Jun. 19, 2016(1):1-14.

*Primary Examiner* — Robert S Cabral
(74) *Attorney, Agent, or Firm* — Lewis Kohn & Walker LLP; David M. Kohn; Kari Moyer-Henry (57) ABSTRACT

A method and an apparatus for producing radionuclide-containing products having substantially the identical desired activity of radioactivity at different times of application, with respect to a given calibration time. The method according to the invention allows to ensure a consistent composition of the desired radionuclide-labeled pharmaceutical at all times of application within the shelf life through a single manufacturing process. With the present invention it is possible, for example, to provide [n.c.a. Lu-177]Lu-DOTATOC on each working day of the week with constant activity at the respective time of application in a single manufacturing step.

18 Claims, 9 Drawing Sheets

RADIOPHARMACEUTICALS AT DIFFERENT ACTIVITY REFERENCE TIMES

The present invention relates to a method for the manufacture of radionuclide-containing products having substantially the same desired activity of radioactivity at different times of application, related to a given calibration time (Activity Reference Time, ART) point according to:
- a radionuclide-containing concentrate is provided which contains the desired radionuclide in such an activity that a plurality of desired batches, each with a defined number of partial fillings, can be obtained from the concentrate at a filling time, each batch of partial fillings at different times of application (ART+1, ART+2, ART+3, ART+4) in each case substantially having an identical activity of the radionuclide, with respect to the calibration time (ART);
- the radionuclide of the concentrate is converted to a desired radionuclide-labeled product and thus a bulk solution is obtained which, in addition to the radionuclide-labeled product, contains all further components required for the intended use;
- the activity of the radionuclide-labeled product in the bulk solution is set to a latest desired time of application (ART+4);
- from the bulk solution containing the radionuclide-labeled product a first batch of partial fillings is taken at a first filling time prior to the time of application, which has an activity set to the latest time of application (ART+4) which, at its actual time of application, corresponds to the activity at the calibration time (ART);
- a diluting solution is provided, which, with the exception of the radionuclide-labeled product, includes all other components required for the intended use;
  - the remaining bulk solution set to the latest desired time of application (ART+4) is diluted with the diluting solution in such a way that, at the time of filling, a desired reduced activity based on the latest time of application (ART+4) is set, so that for use at the preceding time of application, a second batch of partial fillings is taken, which has an activity set to an earlier time of application (ART+3), which at its actual time of application, corresponds to the activity at the calibration time (ART);
- the remaining bulk solution set to the earlier time of application (ART+3) is continued to be diluted stepwise with the diluting solution until the time of application corresponds to the calibration time (ART); and
- further batches of partial fillings are respectively taken at each further time of application (ART+2, ART+1), which have an activity set to the respective time of application (ART+2, ART+1), the last batch having the activity of the calibration time (ART).

The present invention further relates to an apparatus comprising a fluidic system to which the following components are connected:
- an adjustable heating element (1);
- an adjustable vacuum pump (2) with pneumatics and bleed valves;
- adjustable inert gas pneumatics (3);
- at least one reactor (4) a vessel (5) for a formulation solution, which is connected to the reactor (4) in a fluidic manner;
- a vessel (6) for a diluting solution;
- a reaction buffer vessel (7);
- a receiver vessel (8) for a radiochemical precursor;
- a filling dosing device (9);
- a bulk storage and mixing vessel (10);
- a ventilated sterile filter (11);
- an air filter (12, 15);
- a by-pass line (13) between the non-sterile side of the sterile filter (11) and the bulk storage and mixing vessel (10) connected thereto in a fluidic manner via a three-way valve;
- a filling device (14); as well as
- a first cock bank (16) having multi-port valves; and
- a second cock bank (17) having multi-port valves;
- wherein the first cock bank (16) is in fluidic communication with the inert gas pneumatics (3), the vessel (6), the sterile filter (11) as well as the filling dosing device (9); and
- wherein the second cock bank (17) is in fluidic communication with the reactor (4), the receiver vessel (8), the reaction buffer vessel (7), the by-pass line (13), the bulk storage and mixing vessel (10) and the air filter (12), the bulk storage and mixing vessel (10) being in fluidic communication with the vacuum pump (2).

Radiopharmaceuticals are radioactive compounds, which are used in nuclear medicine. A distinction is made between diagnostic and therapeutic radiopharmaceuticals or so-called theranostics, which can be used both therapeutically and diagnostically. Such pharmaceuticals are very often produced directly on-site, which appears necessary due to their short half-life or lifespan, especially in the case of diagnostic compounds. Until a few years ago, complex therapeutic radiopharmaceuticals likewise were often only produced locally in small quantities on a patient-oriented basis. Merely simple representable, less complex radiopharmaceuticals which consist either of only one radionuclide or a simple radionuclide formulation have hitherto been produced centrally and distributed to users of nuclear medicine. Such pharmaceuticals include, for example, [I-131]NaI, [Ra-223]RaCl$_2$, and [Sm-153]Sm-EDTMP.

In the meantime, a number of suitable radioactive isotopes are available to skilled persons in sufficient quantity and pharmaceutical quality. By way of example, it is pointed out to isotopes Lu-177 and Ga-68, which recently have become important:

For example, the applicant of the present patent application describes in EP2546839B1 an already patented method for the manufacture of carrier-free, high-purity Lu-177 compounds (half-life=6.64 days, β$^-$-decay) for medicinal purposes.

In particular, a preparative column chromatographic method for the manufacture of such carrier-free, high-purity $^{177}$Lu compounds is disclosed therein. The $^{177}$Lu manufacturing method makes use of a cation exchanger and a suitable complexing agent. With the aforementioned method, it is possible for the first time to make available carrier-free high purity $^{177}$Lu compounds in milligram quantities for pharmaceutical-medicinal purposes from $^{176}$Yb compounds irradiated with thermal neutrons, the radionuclides $^{177}$Lu and $^{176}$Yb being provided for purification in a mass ratio of approx. $1:10^2$ to $1:10^{10}$.

Furthermore, WO/2018/122250A1 of the applicant of the present patent application discloses a $^{68}$Ge/$^{68}$Ga generator with which the positron emitter Ga-68 (half-life=67.71 minutes) can be produced continuously on-site, e.g. in the nuclear medical laboratory of a clinic, in pharmaceutical quality for the manufacture of theranostics.

A general overview of stable concentrated radionuclide complex solutions of the prior art is provided, for example, by U.S. Ser. No. 10/596,278B2.

Chelator components for radionuclides and target components are described in detail, for example, in EP 1 289 571 B1 and thus are well known to a skilled person. The indicated document relates to prochelators and chelators of radio metal-labeled molecules in general.

Macrocyclic polyaza compounds are described therein for labeling with radioactive metals, containing an $N_n$-system, wherein n stands for 4, 5 or 6 with different ring sizes, and wherein at least one of the N-atoms for coupling to an amino function in a biologically active effector molecule is substituted by a free carboxyl group, wherein, for synthesis of the final molecule, all of the N atoms carry a protected side chain.

In particular, EP 1 289 571 B1 describes a chelating agent for labeling biologically active molecules with a radioactive metal having the following general formula:

wherein:

the two Y groups may be arranged either trans or cis, as shown;

A represents an effector molecule such as a peptide, in particular octreotide, CCK, substance P or gastrin, a protein, in particular an antibody or an enzyme, a sugar or a radio-sensitizing agent such as doxorubicin;

R is hydrogen, a $C_1$-$C_3$ alkyl or an alcohol;

X is a spacer, in particular $(CH_2)_n$—X', where n represents 1-10 and X' stands for COOH, $NH_2$, SH, OH or O-halogen, the halogen being in particular Br, I or Cl, or a molecule of the formula or of the formula Y is COO—, $CH_2CONH_2$ or $CH_2CH_2OH$, complexed with a radioactive metal, as the case may be.

In addition, BREEMAN (2012) [Wouter A. P. BREEMAN; Practical Aspects of labeling DTPA- and DOTA-Peptides with $^9Y$, $^{111}In$, $^{177}Lu$, and $^{68}Ga$ for Peptide-Receptor Scintigraphy and Peptide-Receptor Radionuclide Therapy in Preclinical and Clinical Applications. The University of New Mexico Health Sciences Center, VOLUME 16, LESSON 5: Nov. 16, 2012] provides an overview of practical aspects of labeling DTPA and DOTA peptides with $^9Y$, $^{111}In$, $^{177}Lu$, and $^{68}Ga$ for peptide receptor scintigraphy and peptide receptor radionuclide therapy in preclinical and clinical applications.

HEPPELER et al (1999) describe somatostatin analogues derivatized with radio metal-labeled macrocyclic chelator components [HEPPELER et al.: "Radiometal-labelled macrocyclic chelator-derivatized somatostatin analogue with superb tumour targeting properties and potential for receptor-mediated internal radiotherapy," Chem. Eur. J., 1999, 5(7), 1974-1981].

EISENWIENER et al. (2001) disclose a synthesis and peptide coupling of a DOTA-based prochelator that forms neutral complexes with yttrium-90 and indium-111. [Eisenwiener et al: "Synthesis and peptide coupling of a new DOTA-based prochelator forming neutral complexes with yttrium-90 and indium-111," Journal of Labelled Compounds and Radiopharmaceuticals, May 2001, vol. 44, No. supplement 1, pp. S694-S696. PRINT. Meeting Info: 14th International symposium on Radiopharmaceutical chemistry Interlaken, Switzerland, Jun. 10-15, 2001].

ANDRÉ et al. (1998) describe 1,4,7-triazacyclononane-1-succinic acid-4,7-diacetic acid (NODASA) as a bi-functional chelator for radioactive gallium-labeled biomolecules [André, J. et al.: "1,4,7-Triazacyclononane-1-succinic acid-4,7-diacetic acid (NODASA): a new bifunctional chelator for radio gallium-labelling of biomolecules," Chem. Commun. 1998, 12, 1301-1302].

Thus, a wide variety of different radionuclides and chelator components and target molecule components suitable therefor, as well as labeling techniques and the use of the labeled molecules for medical purposes is available to a person skilled in the art.

For therapeutic radiopharmaceuticals, which as described above, consist of extremely complex formulations and components, various challenges exist in their centralized manufacture. The decay of the usually short-lived radioactive component, for example, results in the difficulty of safeguarding the same composition of the pharmaceutical at all times of application with respect to a calibration time. This problem is currently solved and was solved in the past by so-called kit reconstitutions at the time of application. Here, the radioactive component of the pharmaceutical is provided separately, and a reconstitution or even a complex synthesis and quality control must be carried out on-site prior to application. Examples include Octreoscan ([In-111]In-pentetreotide) and Zevalin ([Y-90]Y-ibritumomab tiuxetan).

Figure 1A:
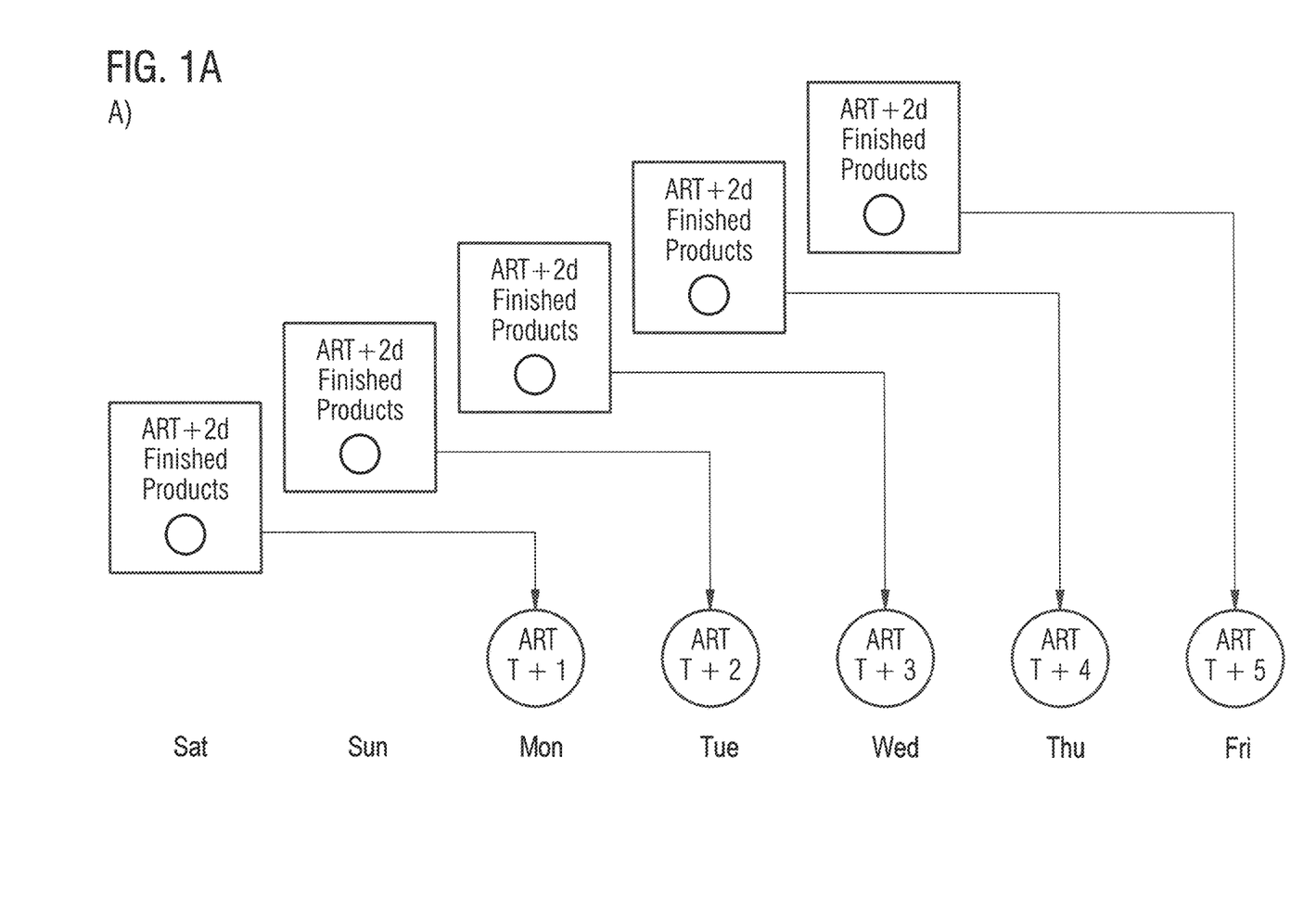
FIG. 1A) and FIG. 1B) are a scheme for providing for a radiopharmaceutical at each time of application within a working week by at least 5 batches of pharmaceuticals by a manufacturer. A) Manufacture on a daily basis. B) Manufacturing pooled. ART=Activity Reference Time (calibration time)

Another possibility to circumvent this difficulty is to manufacture the radiopharmaceutical for a fixed time of application and make it available to a user. Depending on the concept, this results in disadvantages for either the manufacturer or the user. In order to be able to make the pharmaceutical available every day of a working week (Monday to Friday), a manufacturer would have to schedule at least 5 separate small batches per week for a fixed time of application, with corresponding production planning and organizational lead time for the ordering process. Such a production method of the prior art is shown in FIG. 1A). This method is particularly complex and cost-intensive for the manufacturer for regulatory reasons for an admission of pharmaceuticals, since each individual daily batch of pharmaceuticals, in addition to examining the correct amount of radioactivity used, involves intense quality control and release by the drug regulatory authorities. In implementing such a concept, an existing production plant would be at capacity, and could hardly be utilized for the manufacture of radiopharmaceuticals.

Figure 2:
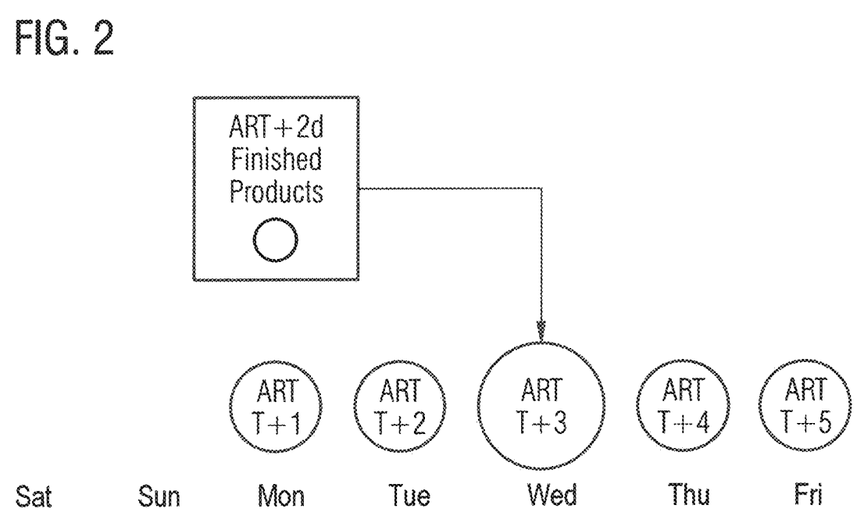
FIG. 2 is a scheme for the provision of a radiopharmaceutical at a specific time of application within a working week by way of a large batch of pharmaceuticals by a manufacturer.

An alternative concept of the prior art is to provide for the manufacture of a single large batch per week. This saves the manufacturer the above-indicated disadvantages and will also allow him/her to produce more cost-effectively. However, the disadvantage of this procedure is that the radiopharmaceutical is only made available to a user at predefined times determined by the manufacturer and the user has to subordinate his/her entire scheduling to the manufacturer. This situation is of particular disadvantage to a clinical user, which consequently leads and, as experience has shown also does lead to less acceptance of the corresponding radiopharmaceutical product. Such a production regime is schematically shown in FIG. 2.

Another alternative is the individualized manufacture of the radiopharmaceuticals at a defined time of use. By calculating the decay of the respectively used isotope, so much less solution can be taken at a defined point in time prior to the time of use that the activity corresponds to the activity at a target time. However, with this approach, neither the radioactivity concentration nor the concentration of the chemical compounds contained therein are constant and also the amount of the target biomolecule is variable. This may lead to a suboptimal reception of the medication in a patient.

Against this background, it is the object of the present invention to provide an exact and equal amount of radioactivity in radiopharmaceutical products at a specific time of application, with reference to a calibration time, in a plurality of individual batches during a work week, without having to accept the disadvantages described above.

This object is solved by a method for the manufacture of radionuclide-containing products having essentially an identical desired activity of radioactivity at different times of application (ART+1, ART+2, ART+3, ART+4), with respect to a given calibration time (ART), characterized in that
 a radionuclide-containing concentrate is provided which contains the desired radionuclide in such an activity that a plurality of desired batches, each with a defined number of partial fillings, can be obtained from the concentrate at a filling time, each batch of partial fillings at different times of application (ART+1, ART+2, ART+3, ART+4) in each case substantially having an identical activity of the radionuclide, with respect to the calibration time (ART);
 the radionuclide of the concentrate is converted to a desired radionuclide-labeled product and thus a bulk solution is obtained which, in addition to the radionuclide-labeled product, contains all further components required for the intended use;
 the activity of the radionuclide-labeled product in the bulk solution is set to a latest desired time of application (ART+4);
 from the bulk solution containing the radionuclide-labeled product a first batch of partial fillings is taken at a first filling time prior to the time of application, which has an activity set to the latest time of application (ART+4) which, at its actual time of application, corresponds to the activity at the calibration time (ART);
 a diluting solution is provided, which, with the exception of the radionuclide-labeled product, includes all other components required for the intended use;
 the remaining bulk solution set to the latest desired time of application (ART+4) is diluted with the diluting solution in such a way that, at the time of filling, a desired reduced activity based on the latest time of application (ART+4) is set, so that for use at the preceding time of application, a second batch of partial fillings is taken, which has an activity set to an earlier time of application (ART+3), which at its actual time of application, corresponds to the activity at the calibration time (ART);
 the remaining bulk solution set to the earlier time of application (ART+3) is continued to be diluted stepwise with the diluting solution until the time of application corresponds to the calibration time (ART); and
 further batches of partial fillings are respectively taken at each further time of application (ART+2, ART+1), which have an activity set to the respective time of application (ART+2, ART+1), the last batch having the activity of the calibration time (ART).

In terms of an apparatus, the object is solved by an apparatus for carrying out the method comprising a fluidic system to which the following components are connected:
 an adjustable heating element (1);
 an adjustable vacuum pump (2) with pneumatics and bleed valves;
 adjustable inert gas pneumatics (3);
 at least one reactor (4)
 a vessel (5) for a formulation solution, which is connected to the reactor (4) in a fluidic manner;
 a vessel (6) for a diluting solution;
 a reaction buffer vessel (7);
 a receiver vessel (8) for a radiochemical precursor;
 a filling dosing device (9);
 a bulk storage and mixing vessel (10);
 a ventilated sterile filter (11);
 an air filter (12, 15);
 a by-pass line (13) between the non-sterile side of the sterile filter (11) and the bulk storage and mixing vessel (10) connected thereto in a fluidic manner via a three-way valve;
 a filling device (14); as well as a first cock bank (16) having multi-port valves; and
 a second cock bank (17) having multi-port valves;
 wherein the first cock bank (16) is in fluidic communication with the inert gas pneumatics (3), the vessel (6), the sterile filter (11) as well as the filling dosing device (9); and
 wherein the second cock bank (17) is in fluidic communication with the reactor (4), the receiver vessel (8), the reaction buffer vessel (7), the by-pass line (13), the bulk storage and mixing vessel (10) and the air filter (12), the bulk storage and mixing vessel (10) being in fluidic communication with the vacuum pump (2).

More particularly, the present invention relates to a method for the manufacture of radionuclide-containing products having substantially the same desired activity of radioactivity at different times of application (ART+1, ART+2, ART+3, ART+4), based on a given calibration time (ART), wherein
 a radionuclide-containing concentrate is provided which contains the desired radionuclide in such an activity that a plurality of desired batches with a respectively defined number of partial fillings can be obtained from the concentrate at a filling time, each batch of partial fillings substantially having an identical activity of the radionuclide, with respect to the time of calibration (ART) at different times of application (ART+1, ART+2, ART+3, ART+4);
 the radionuclide of the concentrate is converted to a desired product labeled with the radionuclide and thus a bulk solution is obtained which, in addition to the radionuclide-labeled product, contains all further components required for the intended use;
 the activity of the radionuclide-labeled product in the bulk solution is set to a latest desired time of application (ART+4);

from the bulk solution containing the radionuclide-labeled product a first batch of partial fillings is taken at a first filling time prior to the time of application, which has an activity set to the latest time of application (ART+4), which, at its actual time of application, corresponds to the activity at the time of calibration (ART);

a diluting solution is provided which, with the exception of the radionuclide-labeled product, contains all other components required for the intended use;

the remaining bulk solution set to the latest desired time of application (ART+4) is diluted with the diluting solution in such a way that, at the time of filling, a desired reduced activity based on the latest time of application (ART+4) is set, so that for use at the preceding time of application, a second batch of partial fillings is taken that has an activity set to an earlier time of application (ART+3) which, at its actual time of application, corresponds to the activity at the calibration time (ART);

the remaining bulk solution set to the earlier time of application (ART+3) continues to be diluted step by step with the diluting solution until the time of application corresponds to the calibration time (ART); and further batches of partial fillings are respectively taken at each further time of application (ART+2, ART+1), which have an activity set to the respective time of application (ART+2, ART+1), with the last batch having the activity of the calibration time (ART).

The invention enables the manufacture of the pharmaceutical preparation Solucin® (registered trademark of ITM Isotopen Technologien München AG) in a single manufacturing approach to all possible ARTs in a small and compact plant, which also includes filling. Compared to the current prior art, significantly less approaches are required (cf. FIG. 5). By this, the manufacturer saves manufacturing, testing and release costs without restricting the availability of the pharmaceutical. Moreover, additional capacities for other products are gained at the production plant, which signifies an increase in productivity and efficiency. There is no theoretical limit for the bulk approaches. In contrast to alternative 1 a second filling unit can be dispensed with in alternative 2 according to the invention, which in turn saves investment, maintenance and qualification costs.

The present invention further relates to an apparatus for carrying out the method according to the invention, comprising a fluidic system to which the following components are connected:

an adjustable heating element;
an adjustable vacuum pump with pneumatics and bleed valves;
adjustable inert gas pneumatics;
at least one reactor;
a vessel for a formulation solution, which is connected to the reactor in a fluidic manner;
a vessel for a diluting solution;
a reaction buffer vessel;
a receiver tank for a radiochemical precursor;
a filling/dosing device;
a bulk storage and mixing vessel;
a vented sterile filter;
an air filter;
a by-pass line between the non-sterile side of the sterile filter and the bulk storage and mixing vessel connected thereto in a fluidic manner by a three-way valve;
a filling device; and
a first cock bank having multi-port valves; and
a second cock bank having multi-port valves;

wherein the first cock bank is in fluidic communication with the inert gas pneumatics, the vessel, the sterile filter, as well as the filling/dosing device; and wherein the second cock bank is in fluidic communication with the reactor, the receiver vessel, the reaction buffer vessel, the by-pass line, the bulk storage and mixing vessel, and the air filter, the bulk storage and mixing vessel being in fluidic communication with the vacuum pump.

Figure 3:
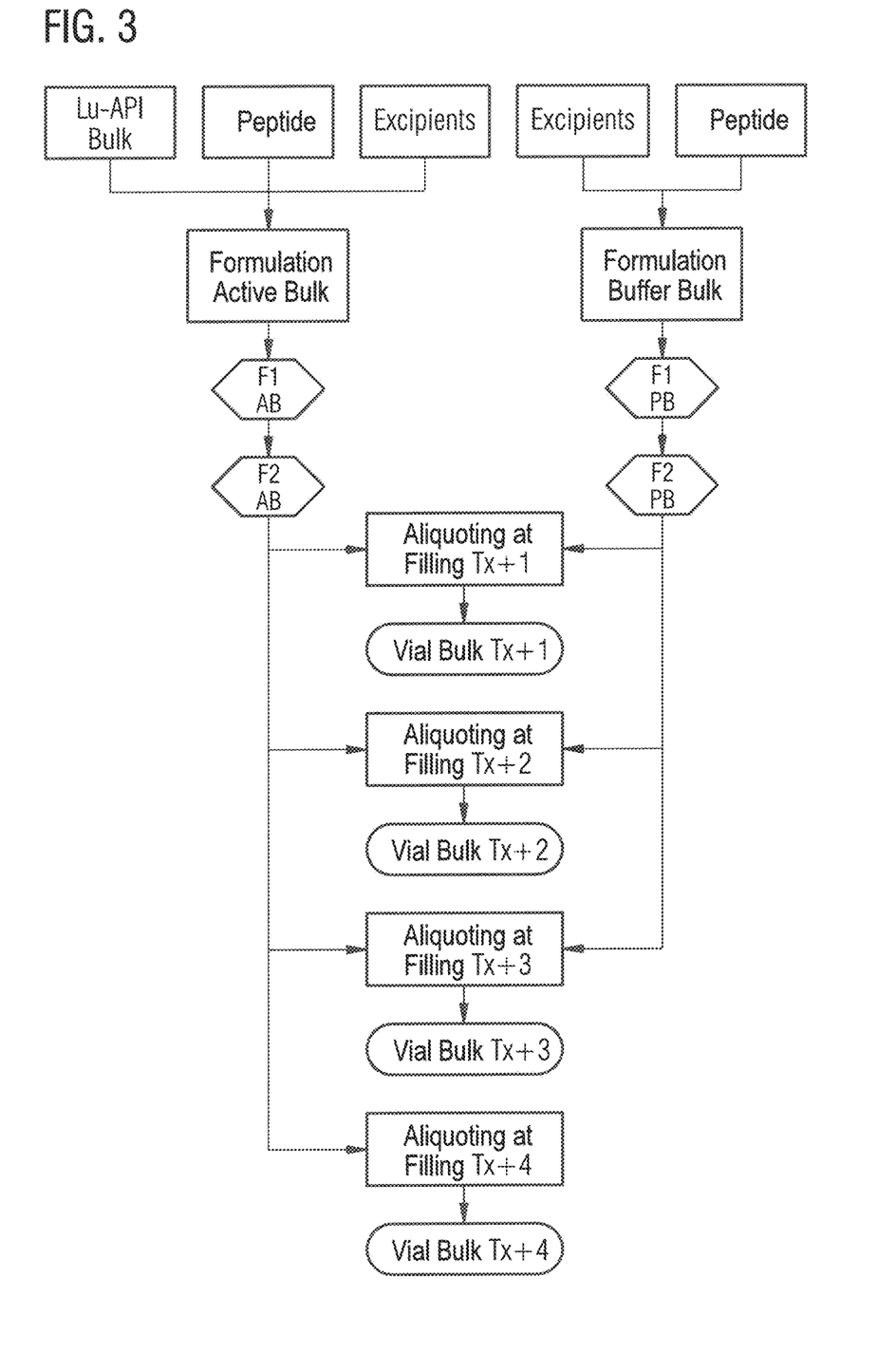
FIG. 3 is a filling scheme according to alternative 1.

In principle, it would be possible to manufacture radiopharmaceuticals for different application times according to alternative 1 as follows:

A concentrate is prepared at the latest calibration time (ART+4). From this concentrate, the ART+4 is directly filled up to 100%. In addition, from this concentrate, using a diluting solution, all other ARTs (ART1-3) can be represented by filling a correspondingly smaller amount of the concentrate into the respective vials and filling them up with a diluting solution to the volume in accordance with the specification. However, this would require two corresponding filling units in the filling line, namely one filling line for the concentrate and one for the diluting solution. The disadvantage of this would be that each vial, under aspects of pharmaceutical legislation or according to GMP, would represent a unique specimen and could result in non-representative sampling in particular in quality controls required in pharmaceutical practice. Moreover, homogenization must be performed in the respective vial. This would signify great validation effort for the filling process and, under the aspects of pharmaceutical legislation mentioned above, would be costly and rather impractical. The filling scheme according to alternative 1 of the prior art is shown in FIG. 3.

Figure 4:
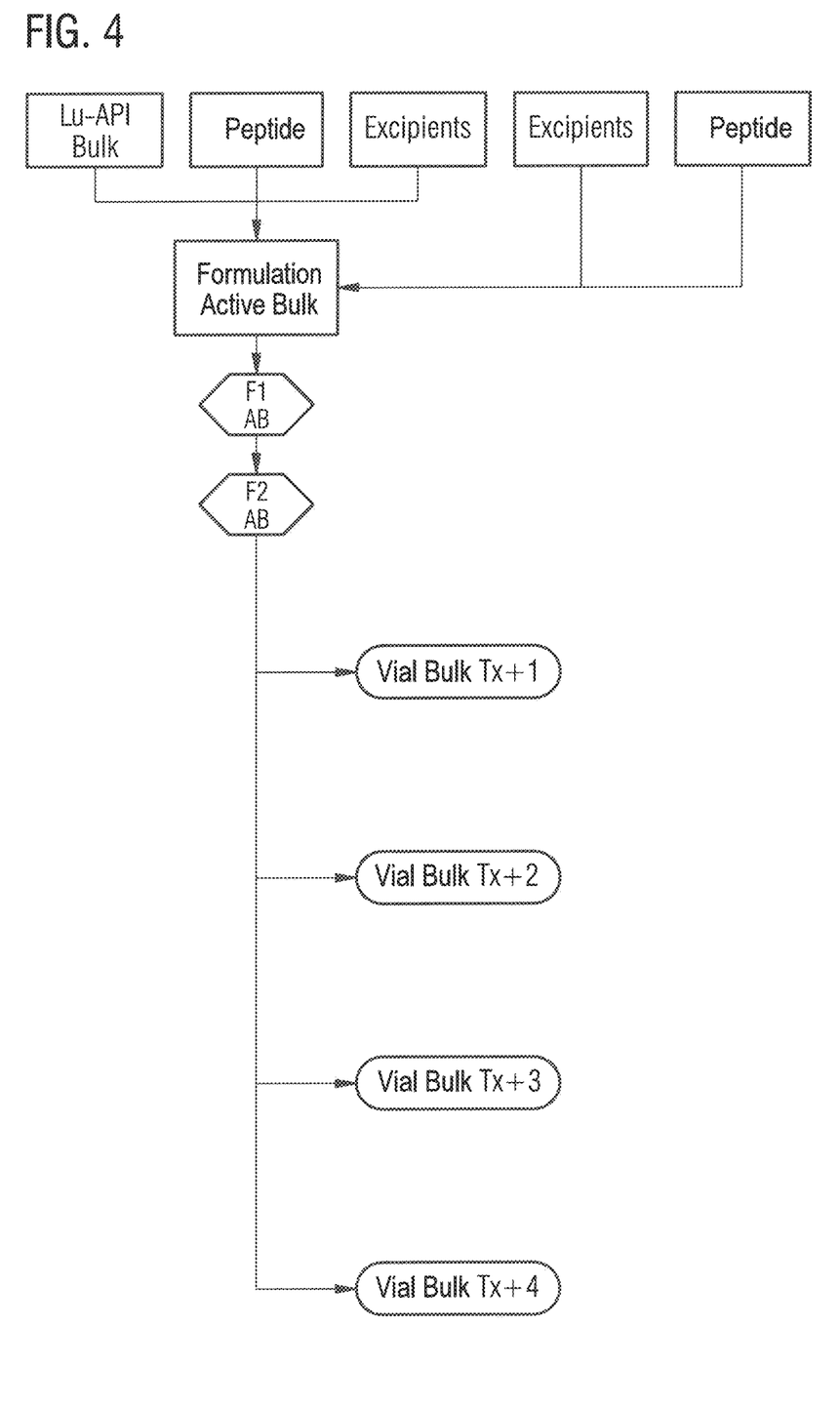
FIG. 4 is a filling scheme according to a method according to the invention (alternative 2)

This is where the invention comes in (alternative 2):

According to the invention, a concentrate is prepared at the latest calibration time (ART+4). From this concentrate, the ART+4 is filled directly and to 100%. In addition, from this concentrate, using a diluting solution, all other ARTs (ART1-3) can be represented. For this purpose, all ART+4 first are filled from the bulk vessel. Subsequently and in contrast to the individual dilution fillings in vials mentioned above, the bulk batch is diluted to Art+3 with subsequent filling of same. Finally, ART+2 and ART+1 etc. will follow. The advantage of the concept according to the invention lies in a significantly smaller plant that consists of merely a single filling unit in the filling line. In addition, the individual fillings are made from a homogeneous bulk batch. This results in a significantly more homogeneous image for sampling in terms of quality control. A filling scheme of the method of the present invention according to alternative 2 is shown in FIG. 4.

In the following, preferred embodiments of the present invention are described.

Particularly advantageously, the method according to the invention can be carried out using all currently relevant radionuclides. These are, for example, those selected from the group consisting of: gallium-68, yttrium-90, molybdenum-99, indium-111, gadolinium-146, gadolinium-147, holmium-166, lutetium-177, tungsten-188, rhenium-188, bismuth-205, bismuth-206, and thorium-227.

Theranostics produced on the basis of the aforementioned short-lived radionuclides—i.e., therapeutically and/or diagnostically applicable substances—have already proved well in nuclear medicine and, using the method according to the invention, can be made available to a clinical user for all times of application within one work week, each with an exactly calibrated activity, in sufficient quantity and in consistently high quality.

Typically, a radionuclide-labeled product is used within the scope of the present invention, which contains at least one chelator component and at least one target molecule component, the target molecule component being capable of binding a specific target in or on a target cell and the chelator component and the target molecule component being bonded covalently to each other to form a chelator-target molecule unit, and the radionuclide being coordinatively bound to the chelator component. This provides for a respectively optimal chemical structure for each radionuclide and target.

Preferably, a product is utilized, in which a cyclic polyaza system with 4 to 8 N atoms is used as chelator component. Such chelators have proven to be advantageous for a number of transition metals. During synthesis of the complex products they also can be reversibly provided without problems with protective groups in order to avoid undesirable side reactions.

A preferred pharmaceutically acceptable chelator component is the commercially available 1,4,7,10-tetraazacyclododecane-1,4,7,10-tetraacetic acid [DOTA] or one of its ionic forms or pharmaceutically acceptable salts.

The target molecule components used within the scope of the present invention in principle follow the intended medical application.

For example, somatostatin analog peptides have proven useful in tumor therapy and diagnostics. Particularly preferred are target molecule components, which are selected from the group consisting of: peptides, in particular cyclic peptides with 4 to 20 amino acids, wherein at least one amino acid is a D-amino acid, in particular D-phenylalanine: and a protein, in particular a receptor protein, preferably PSMA.

The replacement of L-amino acids by D-amino acid enantiomers in the target molecule components is due to the fact that this makes the coupled target peptides less exposed to in vivo attacks of proteases or peptidases because these, typically acting as natural substrates, degrade the physiologically occurring L-amino acid peptides and proteins. By integrating D-amino acids into the target molecule component, the biological half-life is extended significantly as the proteolytic degradation is significantly delayed.

As a somatostatin-analog compound, an octreotide or an octreotide-analog, in particular TOC, has emerged as a target molecule.

A particularly preferred system is to use Edotreotide (DOTATOC) or a pharmaceutically acceptable salt thereof as a chelator-target molecule unit. Within the context of the present invention, it is particularly preferred to use an [n.c.a. Lu-177]Lu-DOTATOC as the radionuclide-containing product. This product, which can be produced by the method according to the invention, selectively binds the tumor tissue of so-called GEP-NETs and destroys it by delivering cytotoxic ionizing radiation doses. Neuroendocrine tumors (NETs) of the gastoenteropancreatic system (GEP) [GEP-NETs] include a group of tumors with wide differences in their growth and hormonal behavior. The spectrum of clinical courses is equally broad: on the one hand, there are benign tumors, which may be diagnosed as incidental findings of imaging or histological reprocessing of surgical preparations; on the other hand, there are clinically unfavorable courses due to rapidly growing tumors.

The present invention is of particular clinical significance for this type of tumor.

The [n.c.a. Lu-177]Lu-DOTATOC provided by the method according to the invention is currently being tested by the applicant of the present invention in clinical phase III (as of February 2021) as Solucin® for the treatment of GEP-Nets in the so-called COMPETE study. The preparation Solucin® consists of two molecular components: on the one hand, of the targeting molecule edotreotide (DOTATOC), a somatostatin analog, and on the other hand, of the EMA-approved beta emitter EndolucinBetaR (no-carrier-added lutetium-177, registered trademark of ITM Isotopen Technologien München AG).

Other product-peptide combinations which may be used in accordance with the invention include, for example, [Lu-177]Lu-PSMA for the therapy and diagnosis of prostate carcinoma.

Preferably, in addition to the active pharmaceutical ingredients (API), excipients and/or buffer systems are utilized in the bulk solution and in the diluting solution.

Advantageously, an ascorbic acid/ascorbate buffer can be used as a buffer system, which has frequently stood the test in practice.

To carry out the method according to the invention, a leakage-free fluidic system under negative pressure is utilized, as this fully avoids radioactive contamination.

In a preferred embodiment, the conversion of the radionuclide to the labelled product is performed by way of precursors, which are mixed with the radionuclide-containing concentrate by means of a temperature-controlled reactor looped into the fluidic system. Through the temperature control, different reaction conditions required for the respective chemical system can be realized. For example, a desired reaction can take place product-specifically at a temperature of 20° ° C. to 100° ° C. and during a time of 5 min to several hours in the reactor.

In order to meet the hygiene standards customary under GMP, each partial filling is led through a sterile filter before it enters a pharmaceutically acceptable vial. For this purpose, commercially available ventilated sterile filters with a pore diameter of 220 nm or multi-layer filters with a pore diameter of 450 nm of a first layer and a pore diameter of 220 nm in a second layer are employed.

Typically, a by-pass line back into a bulk vessel is provided on the non-sterile side of the sterile filer used, whereby, on the one hand, the next batch filling and/or partial filling is prepared and, on the other hand, substantially loss-free purging of a filling line and the sterile filter on its non-sterile side can be carried out in an advantageous manner via the by-pass line between the individual batches, so that no radioactivity is carried over to the next filling in an uncontrolled manner and the calibration to the ART also is correct for the subsequent filling.

To ensure quality, GMP-compliant samples are taken from each batch for quality control. It has turned out that each of the batches taken individually show a homogenous image.

Preferably, the method according to the invention is used to produce [Lutetium-177]Lu-DOTATOC (SOLUCIN®) as a radionuclide containing product, wherein a concentrate is used, which, with respect to the calibration time (ART), contains the following activity and components:

| Lutetium-177 | 7.5 ± 0.7 GBq |
| Edotreotide (DOTATOC) | 150 ± 15 μm |

-continued

| | |
|---|---|
| Ascorbic acid | 20 ± 2 mg |
| Na-ascorbate | 80 ± 8 mg |
| Ultrapure water | 1.00 ± 0.01 ml |
| 0.1M Na-ascorbate diluting solution | 18.0 ± 2 ml. |

BRIEF DESCRIPTION OF DRAWINGS

Further advantages and features of the present invention will become apparent on the basis of the description of embodiments as well as by way of the drawing.

EXAMPLE OF EMBODIMENT

The present invention is described without restriction hereto by the example of a method for the manufacture of Solucin® (registered trademark of ITM Isotopen Technologien München AG). Active ingredient of the pharmaceutical preparation Solucin® is [n.c.a. Lu-177]Lu-DOTATOC.

Naturally, the principles of the present invention can also be transferred to other radiolabeled pharmaceuticals such as [Lu-177]Lu-PSMA. The same applies to the use with other short-lived radionuclides.

Figure 1B:
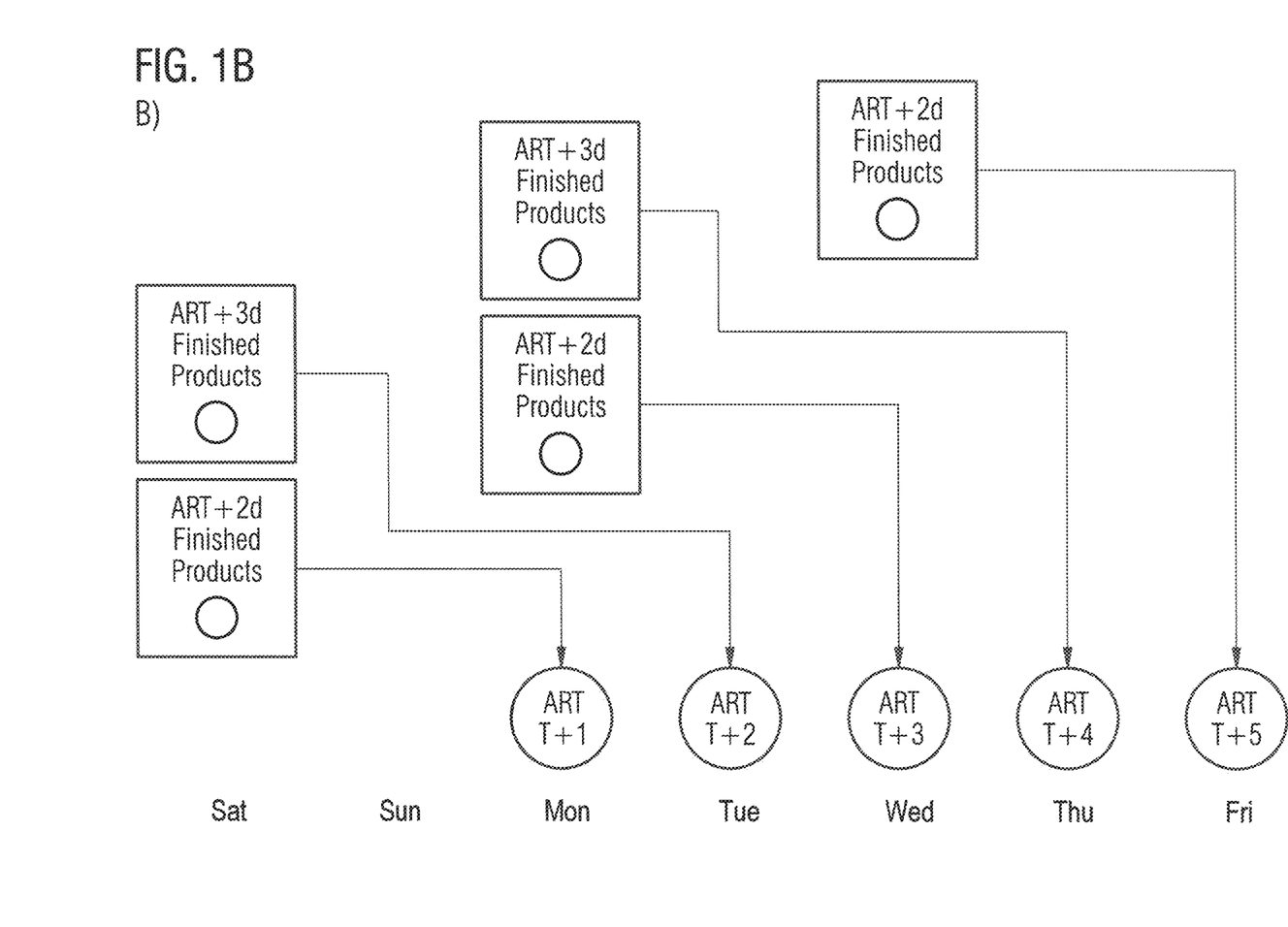

FIG. 1A) and FIG. 1B) schematically illustrate the provision of a radiopharmaceutical according to the prior art at any time of application within a working week by at least 5 batches of pharmaceuticals by one manufacturer. FIG. 1A) shows the situation in case of daily manufacture, while FIG. 1B) shows the situation with pooled production. ART is the "Activity Reference Time", i.e. the calibration time.

FIG. 2 shows a schematic representation of the manufacturing situation when a radiopharmaceutical is only provided by a manufacturer at a specific time within a working week—in this case Wednesdays.

Figure 5:
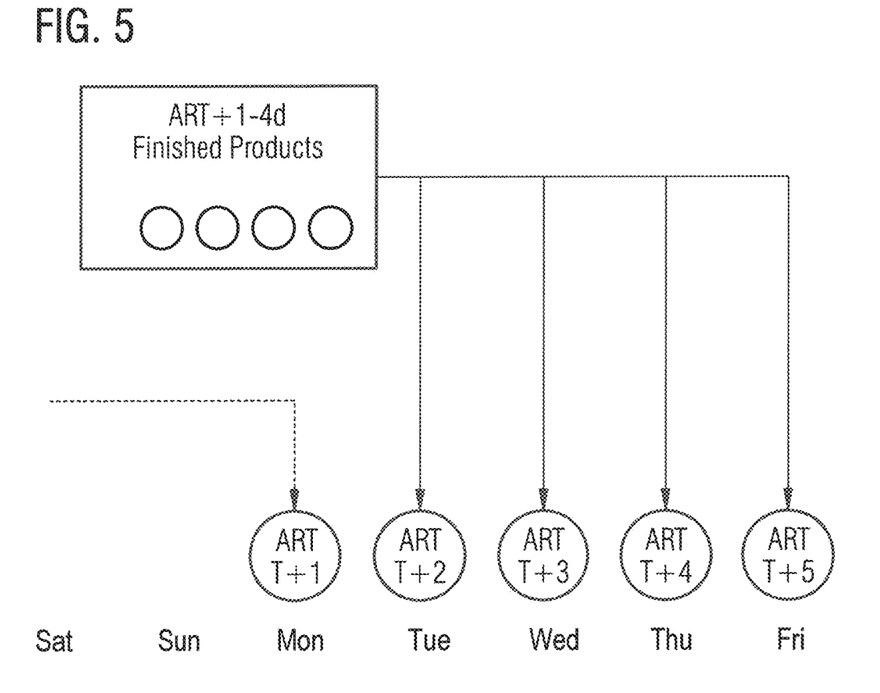
FIG. 5 is a scheme for providing a radiopharmaceutical at several times of application within a working week by a single synthesis approach according to the invention.

In contrast to the methods of the prior art, the method according to the invention allows for safeguarding a consistent composition of the desired radionuclide-labeled pharmaceutical at all times of application within the shelf life (Table 1) by a single manufacturing process. The filling scheme according to the present invention is shown in FIG. 4, and the situation of providing a radiopharmaceutical at several times of application within a working week by a single synthesis approach according to the present invention is shown in FIG. 5.

TABLE 1

Exemplary specification of Solucin ® at the calibration time point (ART)

| Component | Amount per vessel (vial)/Value on ART |
|---|---|
| Lutetium ($^{177}$Lu) | 7.5 ± 0.7 GBq |
| Edotreotide | 150 ± 15 µg |
| Ascorbic acid | 20 ± 2 mg |
| Sodium ascorbate | 80 ± 8 mg |
| Ultrapure water | 1.00 ± 0.01 ml |
| Formulation, 0.1M of sodium ascorbate | 18 ± 2 ml |

The special configuration of the process fluidics and the composition of the reagents used ensure a compact, easily scalable and transferable synthesis. This makes it possible to reduce manufacture to a single bulk batch and guarantee the advantages of daily availability.

Figure 6:
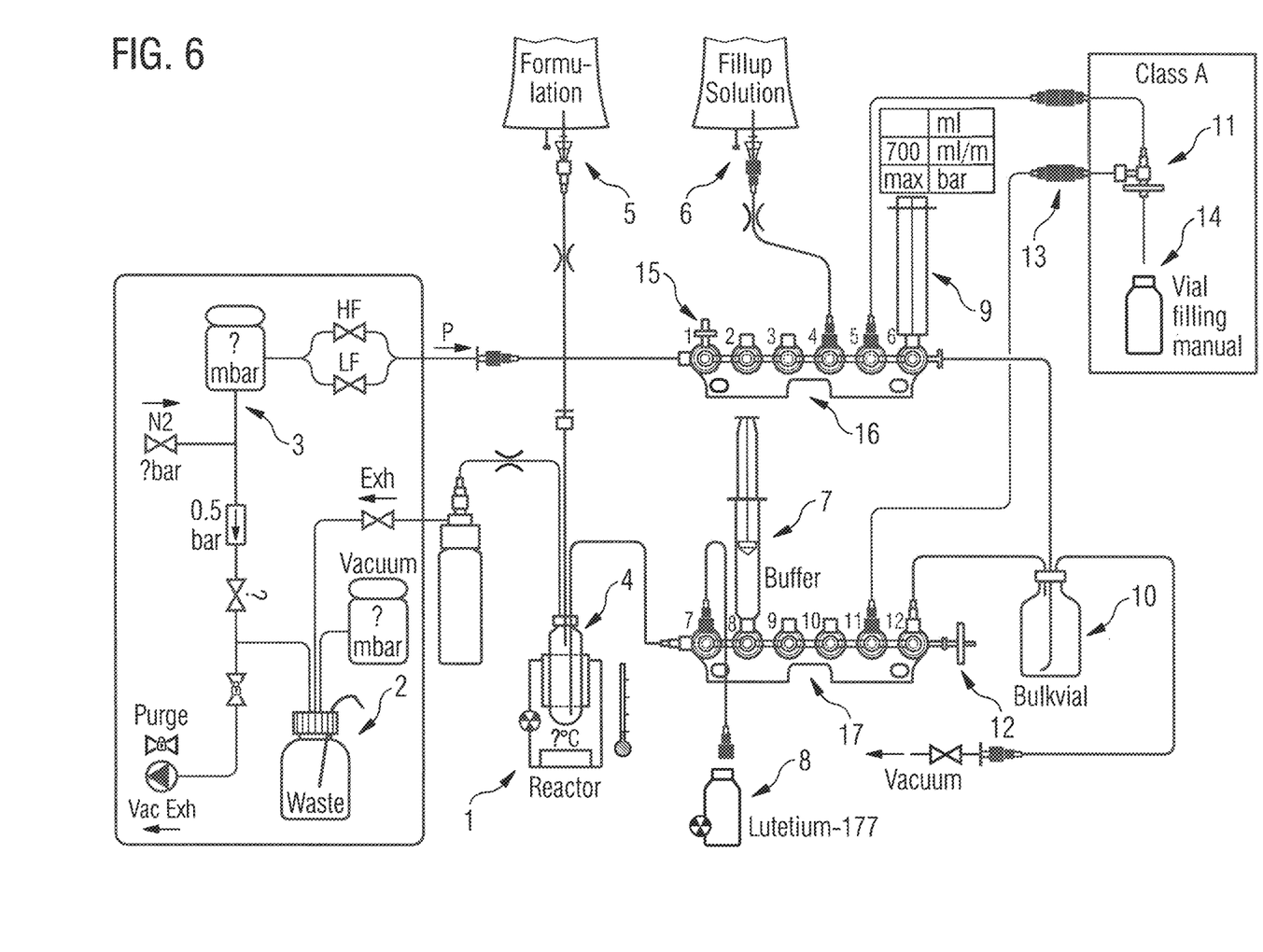
FIG. 6 is a schematic arrangement of a synthesis apparatus and structure of the fluidic system of an apparatus for carrying out the method according to the invention.

FIG. 6 shows the schematic structure of the fluidic system, as well as the further devices and arrangements for synthesis, including:

A controllable temperature element 1 for heating up to 100° C. within 5 min;

A controllable vacuum pump of 2 to up to 200 mbar with pneumatics and bleed valves;

An adjustable nitrogen pneumatic system 3, which supplies a pressure of up to 6 bar;

A reactor 4 made of glass or plastics with 2-3 connections;

A vessel 5 or bag for the formulation solution;

A vessel 6 or bag for the diluting solution;

A reaction buffer in a syringe 7, vial or vessel;

A template 8 for a radiochemical precursor, in the example case Lu-177;

A filling syringe of 1-20 ml;

A bulk storage and mixing vessel 10;

A vented sterile filter of 0.22 µm or multilayer filter of 0.45 µm, 0.22 µm;

An air filter of 0.22 µm;

A by-pass line 13 with aseptic connector;

An open- or closed-vial filling station 14;

An air filter of 0.22 µm;

A first cock bank 16 with 2-3 port valves; and

A second cock bank 17 with 2-3 port valves.

Due to the layout, the transfer of fluids can be performed in a leak-proof manner by means of negative pressure. The syringe pump 9 is used solely for filling purposes and for diluting the bulk preparation to the corresponding ARTs. The preparation of the ART-specific bulk solutions can be carried out as follows:

1. Preparation of the radiolabeled concentrate by adding buffer solution to the radiochemical and chemical precursor and heating in an appropriate reactor. Temperature and time are product specific and can vary from room temperature to 100° C. and from 5 minutes to several hours.

2. Preparation of the latest ART (e.g. ART+4 days after manufacture) through addition of the formulation solution and mixing in the bulk vessel 10 to the ready-to-fill pharmaceutical. ART+4 in this case means that the pharmaceutical at the calibration time (ART) in the example case meets the specification according to Table 1.

3. Loss-free purging of the filling line and the sterile filter 11 (non-sterile side) via the bypass line 13 back into the bulk vessel 10 in preparation for filling.
4. Filling ART+4 days and/or sampling for quality control.
5. After completion of the filling, further sampling can optionally be performed or else a filter integrity test can be performed with the aid of the syringe pump 7 or the N2 pneumatic system 3.
6. The filling syringe 9 is used to dilute the bulk Art+4 days to the ART+3 days (or ART+4−X days) using the diluting solution (fill-up solution).
7. Subsequently, homogenization of the bulk preparation and purging of the by-pass line 13 are carried out analogous to the process described in point 3.
8. Filling of the ART+3 days bulk batch etc. is then carried out in the same way as described above.

Figure 7:
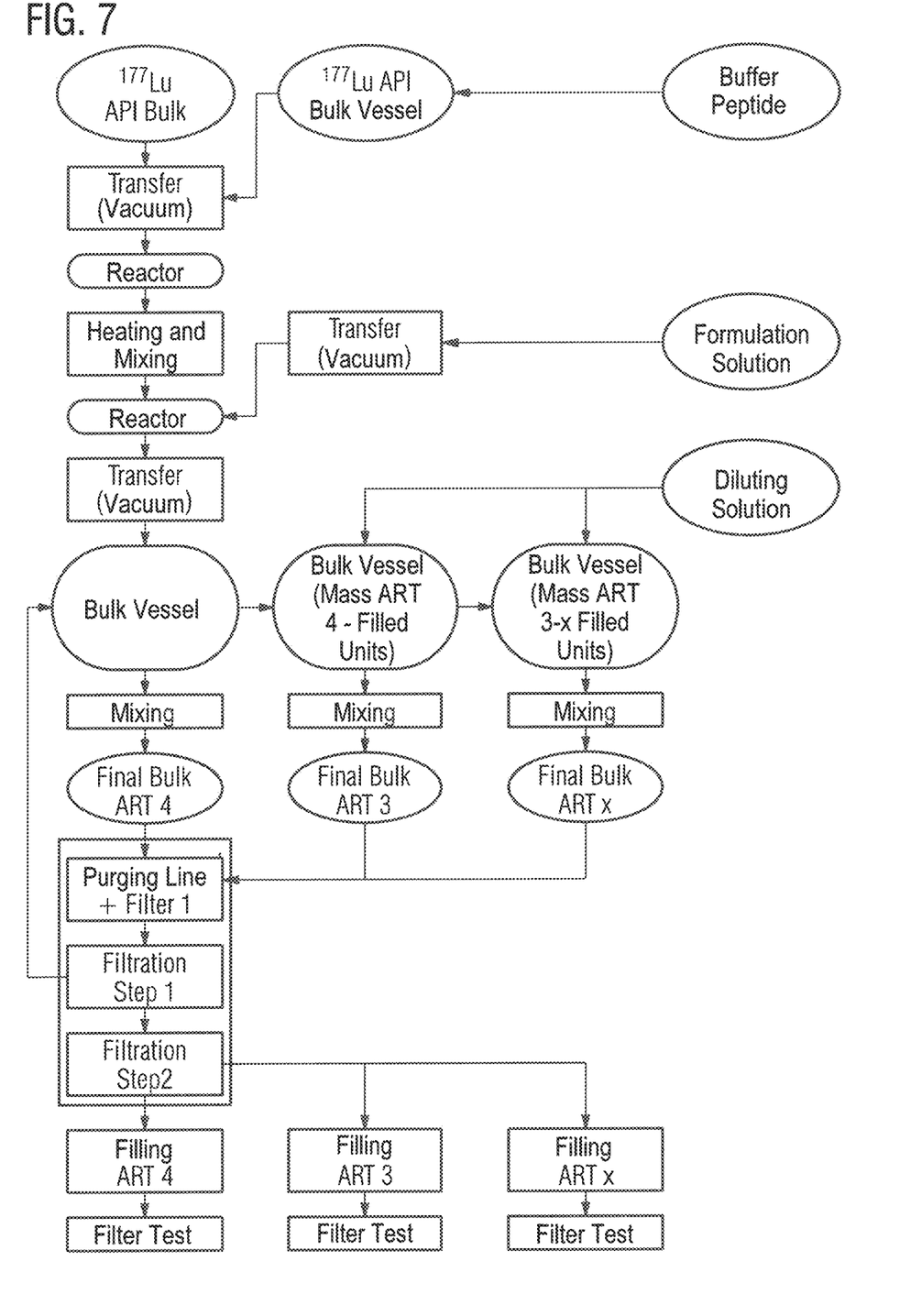
FIG. 7 is a flow diagram for the manufacture of ART-specific fillings according to the structure in FIG. 6.

The flow chart according to FIG. 7 provides a schematic overview of the manufacturing process of ART-specific fillings according to the invention with a fluidic system according to FIG. 6.

The composition of the diluting solution and the addition quantities to the individual ARTs can be easily calculated by way of the specification of the radiopharmaceutical. For the example Solucin® ([n.c.a. $^{177}$Lu]Lu-DOTATOC) in Table 1, the data are obtained as shown in Tables 2 and 3:

TABLE 2

Composition of the final radiopharmaceutical and the diluting solution.

| Content | Specified Concentration on the ART | Concentration of the Diluting solution |
|---|---|---|
| Lutetium ($^{177}$Lu) | 0.64 GBq/mL ± 10% | — |
| Edotreotide | max. 8.33 µg/mL | max. 8.33 µg/mL |
| Sodium ascorbate | 0.1M | 0.1M |

TABLE 3

Proportion of ART + 4 days formulation on the corresponding ART + 4 − X days Formulations.

| ART Days | Activity on ART [GBq] | Activity At time of filling [GBq] | Vol. of the ART + 4 [mL] | Diluting solution from Table 2 [mL] | Concentration on ART [GBq/mL] | DOTATOC [µg] |
|---|---|---|---|---|---|---|
| 0 | 7.7 | 7.7 | 12.1 | 5.9 | 0.64 | 150 |
| 1 | 7.7 | 8.5 | 13.3 | 4.7 | 0.64 | 150 |
| 2 | 7.6 | 9.4 | 14.7 | 3.3 | 0.64 | 150 |
| 3 | 7.7 | 10.5 | 16.4 | 1.6 | 0.64 | 150 |
| 4 | 7.6 | 11.5 | 18.0 | 0.0 | 0.64 | 150 |

With appropriate job scheduling and an easily validatable spreadsheet, production planning with the method according to the invention is easy to implement.

Crucial to the implementation of the present invention is a by-pass via a by-pass line 13 from the sterile filter 11 back to the bulk vessel 10. Through the circulation of the solutions between the filling line/sterile filter and the bulk vessel, loss-free filling of all specific ARTs in one plant can be created in an economical and waste management manner. In order to represent the specific ARTs in one approach, either two filling lines are necessary in an alternative 1, or else the filling line would have to be emptied and purged again after each ART, whereby in the case of very long lines (to be expected, as the cleanroom classes change from C to A due to new regulations), thus high losses and additional radioactive waste would occur. For this reason, especially the by-pass has a particular advantage for the technical solution of the object.

Figure 8:
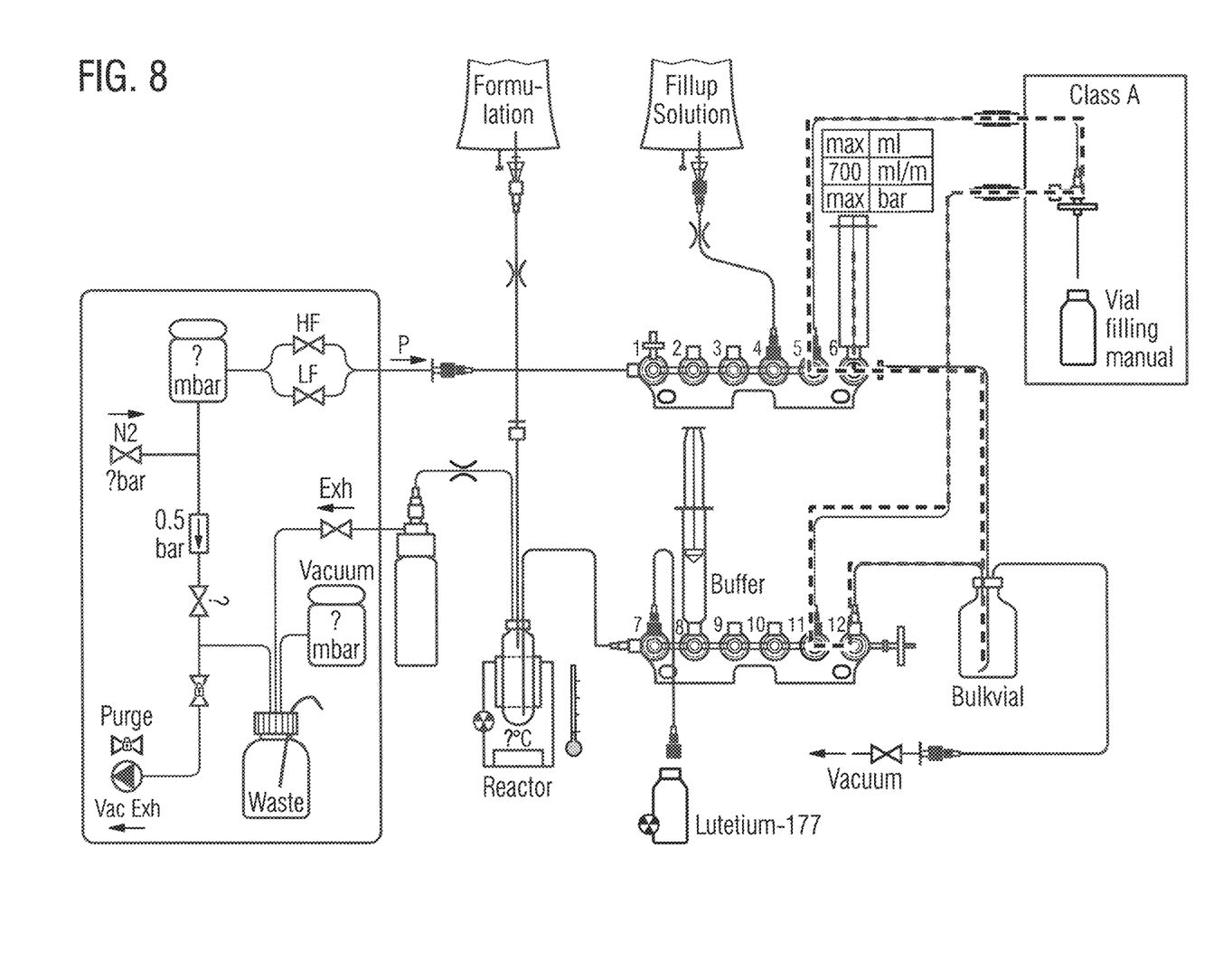
FIG. 8 is a scheme of the purging process of a filling line and a sterile filter via a by-pass.

FIG. 8 shows the circulation of the bulk solution and the purging process via the line paths shown in dashed form. This purging process guarantees loss-free filling and a homogeneous filling solution after setting the specific ARTs. In the present exemplary method, it can be achieved, in particular by means of the by-pass line 13 upstream of the sterile filter 11 back into the bulk vessel 10, that also the line paths are purged and filled with homogeneous solution. The by-pass line 13 is opened by a valve of the first cock bank 16 during purging, and closed during filling. When the by-pass line 13 is open, the natural resistance of the sterile filter 11 prevents liquid from escaping via sterile filter 11 and directs the flow direction of the medium into the bulk vessel 10.

The invention claimed is:

1. A method for the manufacture of radionuclide-containing medical products having an identical desired activity of radioactivity at different times of application with respect to a given calibration time,
characterized by the following steps:
converting a radionuclide-containing concentrate to a desired radionuclide-labeled product wherein a bulk solution is obtained which contains the radionuclide-labeled product;
obtaining from the bulk solution the desired radionuclide contained in the bulk solution in such an activity that a plurality of desired batches, each with a defined number of partial fillings from the bulk solution at a filling time, each batch of partial fillings at different times of application in each case having an identical activity of the radionuclide, with respect to the given calibration time;
setting the activity of the radionuclide-labeled product in the bulk solution to a latest desired time of application;
taking a first batch of partial fillings from the bulk solution containing the radionuclide-labeled product at a first filling time prior to the time of application, which has an activity set to a latest time of application which, at its actual time of application, corresponds to the activity at the given calibration time;
providing a diluting solution which includes all components required for an intended medical application;
diluting a remaining bulk solution set to the latest desired time of application with the diluting solution that, a desired reduced activity based on the latest time of application is set, so that for use at the time of medical application a second batch of partial fillings is taken, which has an activity set to an earlier time of application, which at its actual time of application corresponds to the activity at the given calibration time;
continuing to dilute stepwise with the diluting solution the remaining bulk solution which is set to the earlier time of application until the application time corresponds to the given calibration time; and
taking further batches of partial fillings respectively at each further time of application, which have an activity set to the respective time of application, the last batch having the activity of the given calibration time.

2. The method of claim 1, characterized in that the radionuclide is selected from the group consisting of: gallium-68, yttrium-90, molybdenum-99, indium-111, gadolinium-146, gadolinium 147, holmium-166, lutetium-177, tungsten-188, rhenium-188, bismuth-205, bismuth-206 and thorium-227.

3. The method of claim 1, characterized in that a radionuclide-labeled product is used which contains at least one chelator component and at least one target molecule component, the target molecule component being capable of binding to a specific target in or on a target cell and the chelator component and the target molecule component being bonded to each other covalently to form a chelator-target molecule unit, and the radionuclide being coordinately bound to the chelator component.

4. The method according to claim 3, characterized in that a product is used in which a cyclic polyaza system with 4 to 8 N atoms is used as a chelator component.

5. The method of claim 4, characterized in that as the chelator component 1,4,7,10-tetraazacyclododecane-1,4,7,10-tetraacetic acid [DOTA] or one of its ionic forms is used.

6. The method of claim 1, characterized in that the target molecule component is selected from the group consisting of: peptides and a protein.

7. The method of claim 6, characterized in that as the target molecule, a somatostatin analog compound is used.

8. The method of claim 1, characterized in that as chelator target molecule unit edotreotide (DOTATOC) or a pharmaceutically acceptable salt thereof, is used.

9. The method of claim 1, characterized in that as the radionuclide-containing product an [Lu-177]Lu-DOTATOC or an [Lu-177]Lu-PSMA is used.

10. The method of claim 1, characterized in that in addition to active pharmaceutical ingredients (API) of the radionuclide-containing product, excipients and/or buffer systems are used in the bulk solution and the diluting solution.

11. The method of claim 10, characterized in that as a buffer system an ascorbic acid/ascorbate buffer is used.

12. The method of claim 1, characterized in that for carrying out the method, a leakage-free fluidic system under negative pressure is used.

13. The method of claim 12, characterized in that for conversion of the radionuclide to the labeled product, precursors are used, which are converted using the concentrate containing the radionuclide by means of a temperature-controlled reactor (4) introduced into the fluidic system.

14. The method of claim 13, characterized in that the conversion is carried out in the reactor in a product-specific manner at a temperature of 20° C. to 100° C. and for a time ranging from 5 min to several hours.

15. The method of claim 1, characterized in that each partial filling is guided through a sterile filter before entering a pharmaceutically acceptable vial.

16. The method of claim 15, characterized in that as sterile filter, a ventilated sterile filter with a pore diameter of 220 nm or a multilayer filter having a pore diameter of 450 nm of a first layer and a pore diameter of a second layer of 220 nm is used.

17. The method of claim 16, characterized in that on the non-sterile side of the sterile filter, a by-pass line back into a bulk vessel is utilized in preparation for the next batch filling and/or partial filling.

18. The method of claim 1, characterized in that samples are taken from each batch for quality control.

* * * * *